United States Patent [19]

Clain et al.

[11] Patent Number: 5,252,099
[45] Date of Patent: Oct. 12, 1993

[54] METHOD FOR ASSEMBLING A MONITOR TUBE ON A FRAME, THE MONITOR THUS OBTAINED, AND ASSEMBLY MACHINE

[75] Inventors: Jean-Michel Clain, Morangis; Eric Latte, Etampes; Francois Piguillem, Bagneux, all of France

[73] Assignee: Bull, S.A., Paris, France

[21] Appl. No.: 855,006

[22] PCT Filed: Sep. 13, 1991

[86] PCT No.: PCT/FR91/00726
§ 371 Date: May 1, 1992
§ 102(e) Date: May 1, 1992

[87] PCT Pub. No.: WO92/05665
PCT Pub. Date: Apr. 2, 1992

[30] Foreign Application Priority Data

Sep. 14, 1990 [FR] France ............... 90 11408

[51] Int. Cl.⁵ .............................. H01J 9/34
[52] U.S. Cl. .............................. 445/23; 445/66
[58] Field of Search ............... 445/1, 23, 66

[56] References Cited

U.S. PATENT DOCUMENTS 4,820,224 4/1989 Lemche ............... 445/23
4,902,258 2/1990 Dunsmore et al. ....... 445/66 X

FOREIGN PATENT DOCUMENTS 0179955 5/1986 European Pat. Off. .

OTHER PUBLICATIONS

Patent Abstract of Japan, vol. 1, No. 165, Dec. 26, 1977, and JP-A-52 111 327, Sep. 19, 1977.

Primary Examiner—Kenneth J. Ramsey
Attorney, Agent, or Firm—Kerkam, Stowell, Kondracki & Clarke

[57] ABSTRACT

The present invention relates to a method of assembling a monitor tube on a front frame, to the monitor thus obtained, and to the assembly machine. The method of assembling the monitor tube on the front frame of the monitor includes the following steps:
a) placement of a front frame in a housing;
b) blowing air through a nozzle to maintain the tube (105) in suspension;
c) centering the tube (105) by way of two V shape support blocks (501, 521) displaced concentrically and simultaneously;
d) reversing the direction of air through the nozzle to place a suction on the tube (105) and opening of the V shaped support blocks (501, 521);
e) lowering of the tube (105) while connected to the suction to place it into contact with zones (1024) having a high coefficient of adhesion;
f) joining the tube solidly to the front face (102);
g) stopping the air flow to terminate the suction and release the assembled set.

7 Claims, 4 Drawing Sheets 5,252,099

METHOD FOR ASSEMBLING A MONITOR TUBE ON A FRAME, THE MONITOR THUS OBTAINED, AND ASSEMBLY MACHINE

The present invention relates to a method for assembling the tube of a monitor on a front frame of the monitor, the monitor thus obtained, and an assembly machine employing the method.

In monitor manufacturing methods, it is known to mount the tube on a rear box and then to center the frame on the front of the monitor with respect to this assembly.

Another method of mounting a monitor tube, as taught by German Patents 35 43 433 and 37 13 939, consists in centering the tube with respect to the front face formed by the frame, but this method makes it necessary to provide centering elements, which make the design of the front face more complex and impose much closer tolerances on the assembly.

A first object of the invention is accordingly to enable assembly of a tube on the front of a monitor, while assuring its centering in a simple manner. This object is attained in that the method of assembling the tube of a monitor on a front frame of the monitor includes the following steps:

a) placement of a front frame in a housing provided for that purpose;
b) blowing air through a nozzle to maintain the tube in suspension;
c) centering the tube by way of two V shaped support blocks displaced concentrically and simultaneously, while the tube is in suspension;
d) reversing the air flow to place a suction on the tube and opening of the V shaped support blocks with a delay period;
e) lowering the tube while connected to the suction system inside the front face to place it into contact with zones having a high coefficient of adhesion;
f) joining the tube solidly to the front face;
g) stopping to air blow to terminate the suction and release the assembled set.

In another characteristic, between the step a) and b), the method includes a step of placement of cushioning disks.

In another embodiment of the invention, the invention is characterized, between step d) and e), by the step of placing cushioning disks on the tube and placing a case on the cushioning disks.

Another object of the invention is to provide a machine for assembling a monitor tube on the front frame that can be fully automated, is simple and sturdy, and which makes it possible to obtain high-precision centering of the tube.

This object is attained in that the machine for assembling a monitor tube on a front frame includes a table having a housing adapted to receive a frame which forms the front face of the monitor, the housing including an opening in its center, a suction or blower nozzle that is movable along a vertical axis passing through the center of symmetry of the housing and adapted to be actuated by a jack, a centering device to be actuated by a jack for centering the cathode ray tube, and a set of two movable platforms for crosswise displacement by jacks to place the fixation tools into position.

In accordance with an additional embodiment of the invention, the invention is characterized in that the centering device is constituted by a pair of sets of columns mounted vertically on the table and supporting rollers on their end, each set forming a rolling track for centering plates disposed on either side of the opening, said centering plates including a substantially V shaped cutout forming a supporting block, the cutout conforming in shape and size to the tube and an oblique groove inclined so as to control the approach toward one another of the centering plates upon the displacement of jack-controlled actuating prongs.

In accordance with another embodiment of the invention, the invention is characterized in that the actuation prongs are connected with a U-shaped part actuated by a single jack, the legs of the U-shaped part adapted to slide between the rollers in a direction perpendicular to the direction of the centering plates.

In yet another embodiment, the invention is characterized in that the two platforms slide between the rollers and support tools for screwing, welding or gluing the set together.

A final object of the invention is a monitor, the assembly of which is simplified.

This object is attained in that the monitor includes a front face in the form of a frame on which the cathode ray tube of the monitor is adapted to be centered, said frame including fixation means at the corners, to which means attachment pads, connected to the four corners of the tube, are adapted to be affixed with the aid of cushioning disks disposed between the front face and the tube and between the tube and the case, the set being enclosed in the case by the fixation tabs which are adapted to be placed, with the aid of cushioning disks, on top of the fixation tabs of the tube, the set being solidly joined together by means of a fixation device.

Further characteristics and advantages of the present invention will becomes more apparent in the ensuing description, taken in conjunction with the accompanying drawings showing a non-limiting embodiment of the invention, in which drawings.

Figure 1A:
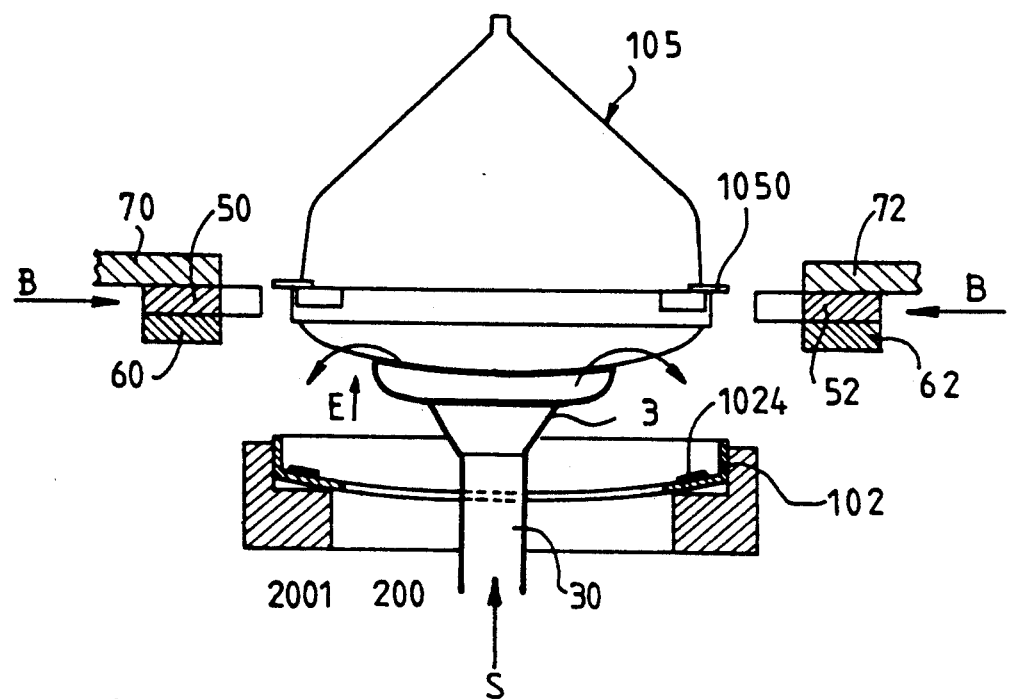
FIGS. 1A and 1B are schematic views showing the manner in which the tube is centered during a suspension phase.

The assembly machine enabling the assembly of a monitor tube in a frame will now be described in conjunction with FIG. 4. This machine enables an automated assembly of the tube (105) FIG. 5 of a monitor including a front face (102) provided with an opening (1020) forming a frame. The tube (105) is centered with respect to this front face (102) and immobilized by means of cushioning disks (104) via tabs (1050) located at the four corners of the tube (105). In a variant, the tube may simply be held with the aid of adhesive means (1024), placed at the inside corners of the frame (102).

At the four corners corresponding to the position of the tube fixation tabs (1050), the frame (102) includes bosses (1021), each being provided with a threaded hole adapted to receive a fixation screw (111). On either side of the bosses (1021) are ribs (1025) which control deformation of the cushioning disks (104). The tube frame (102) includes lateral flanks (1022) adapted to receive a rear box, not visible in the drawing, which is fitted into it.

Cushioning disks (106) are disposed between the tabs (1050) and tabs 112 on rear case (110) for fixation of the tube to the frame (102) and to the rear case (110), in order, among other purposes, to compensate for variations due to tolerances in tube production. The printed circuit boards controlling the function of the monitor are mounted on rear case (110) in grooves (113, 114) formed for that purpose by cutting out and deforming the sheet metal of the case (110).

Figure 4:
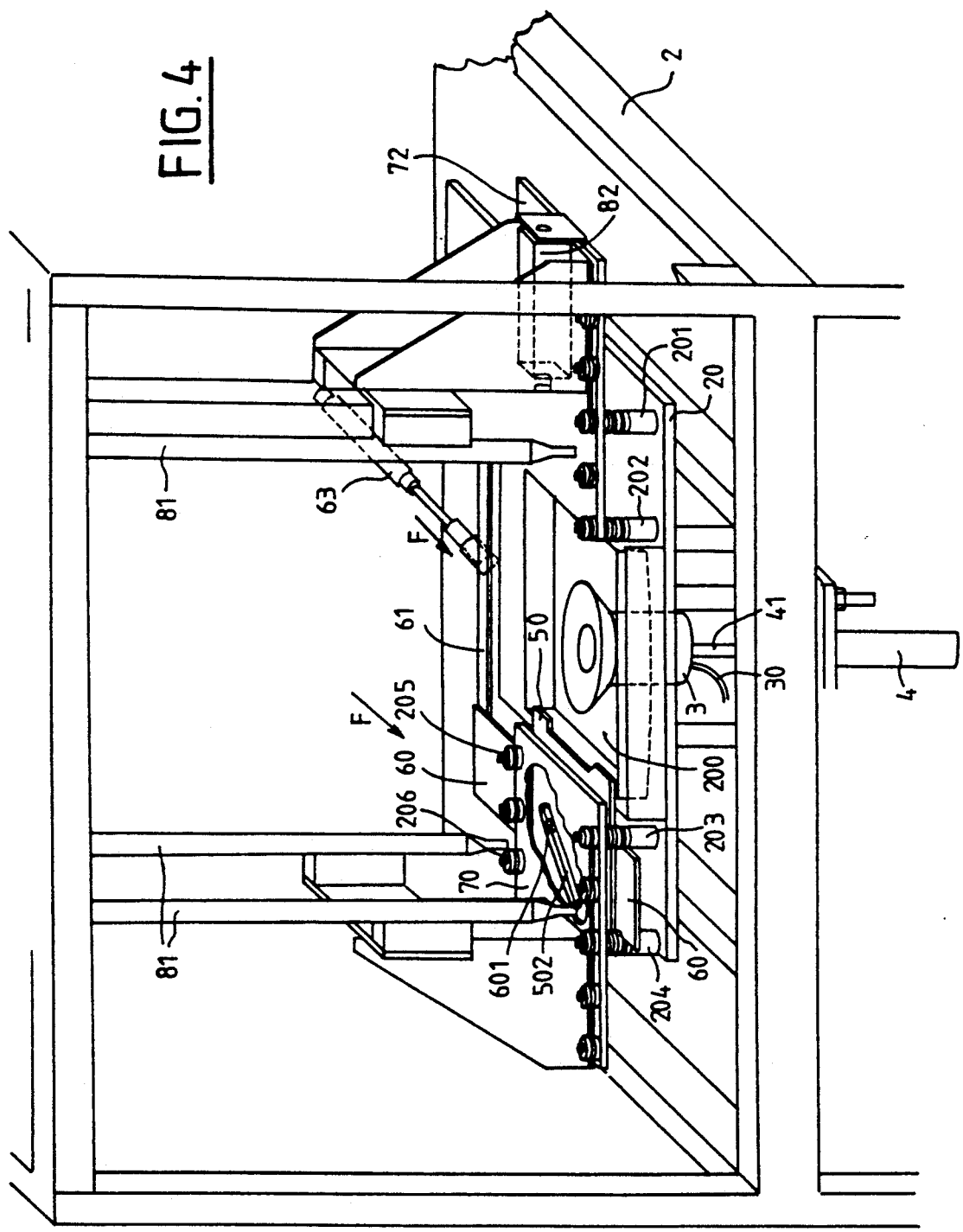
FIG. 4 is a perspective view of the assembly machine.

The monitor thus constituted is assembled with the aid of the machine of FIG. 4, which includes a stand (2) on which a table (20) is mounted. Table (20) includes a pair of sets of small columns (201-202-203-204-205-206 and 207-208, not visible) in its upper portion. The table (20) includes a central opening (200), corresponding substantially in size and shape to the dimension of the opening (1020) of the frame. The edges of the opening (200) in the table (20) include shoulders (2001) (FIG. 1A) that on the periphery of this opening form a housing corresponding in size to the outer dimensions of the frame (102) in which the front face of the monitor is held. A first set of columns (201, 202, 207, 208) is located on one side of the opening, while a second set of columns (203, 204, 205, 206) is located on the other side of the opening, facing the first set. Each set of columns placed on one side of the opening includes at least one pair (203, 204) of columns that constitute a guide track with at least one other pair of columns located on the same side of the opening, thus assuring the sliding of elements (50, 60, 70), (52, 62, 72).

Figure 5:
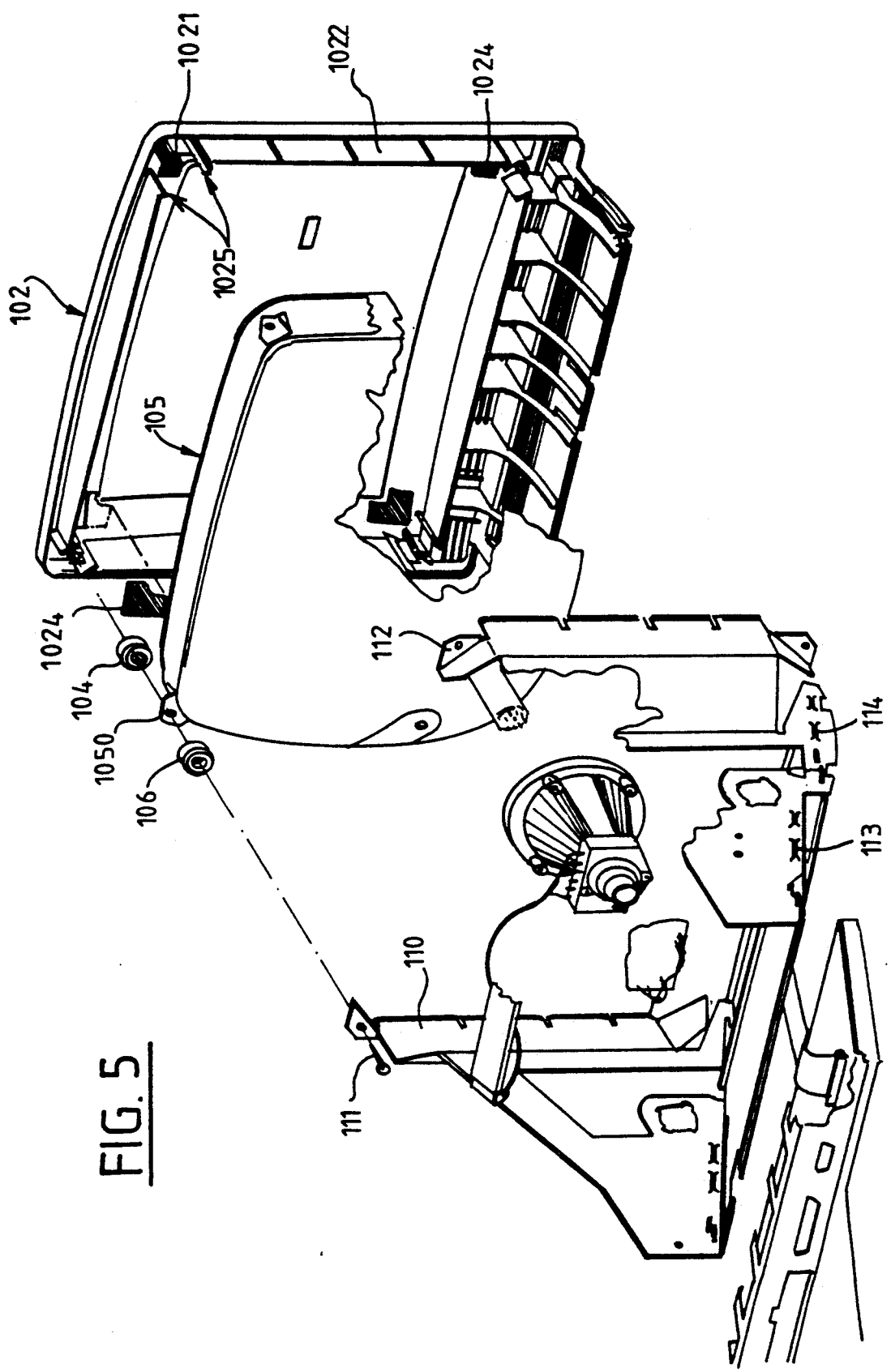
FIG. 5 is a perspective view in fragmentary section of a monitor assembled in accordance with the method of the invention.

The center of the opening (200) in table (20) coincides with a vertical axis A hollow cone shaped nozzle (3) is disposed on the axis and is joined by a tube (30) to a suction and blower apparatus (31), not shown. Nozzle (3) is connected to a jack (4) via a rod (41), which enables the nozzle (3) to be vertically displaced in the direction of the arrow E in FIG. 1A. A first set of plates (50, 52) slide crosswise as indicated by the arrows B of FIG. 1A above a second set of lower plates (60, 62), which slide longitudinally from front to back as indicated by the arrow F of FIG. 4. Located above the plates (50) are a third set of plates (70, 72) for supporting fixation tools (81), constituted by electric screwdrivers, for instance, in the case where a screw-type fixation is used, as shown in FIG. 5. In the case where fixation by welding or gluing is used, the screwdrivers would be replaced with the proper tools. The plates (70, 72) slide between the rollers of the columns forming the sliding tracks in the directions indicated by the arrow B in FIG. 1.

Figure 1B:
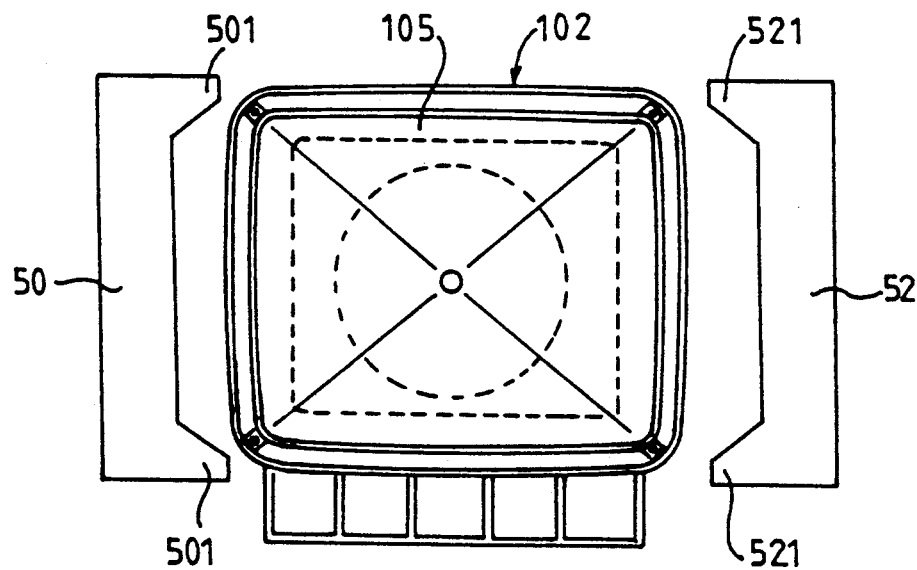

Each plate (50, 52) is provided, towards the opening (200), with a pair of prongs (501, 521) forming therebetween a truncated V, as shown in FIG. 1B, forming substantially V shaped supporting blocks. Each plate (50, 52) includes a groove (502, 522) oriented as shown in FIG. 4 from right to left for the plate (50) located to the left of the opening, and from left to right for the plate (52) located to the right of the opening. A prong (601, 621) connected to a respective plate (60, 62) slides in groove (502, 522). When the plates ,(60, 62) are displaced in the direction of the arrow F, the V-shaped (501,521) are displaced in the grooves (502, 522), causing the prongs (601, 621) to move closer to one another. The displacement of the plates (60, 62), which are connected with a crosswise rod (61), is controlled by a jack (63) that acts upon the crosswise rod (61). The plates (70, 72), located above the substantially V shaped supporting blocks or centering plates (50, 52), are displaced translationally toward the center of the opening (200) by oppositely disposed jacks (80, 82), only one of which is shown.

Figure 2:
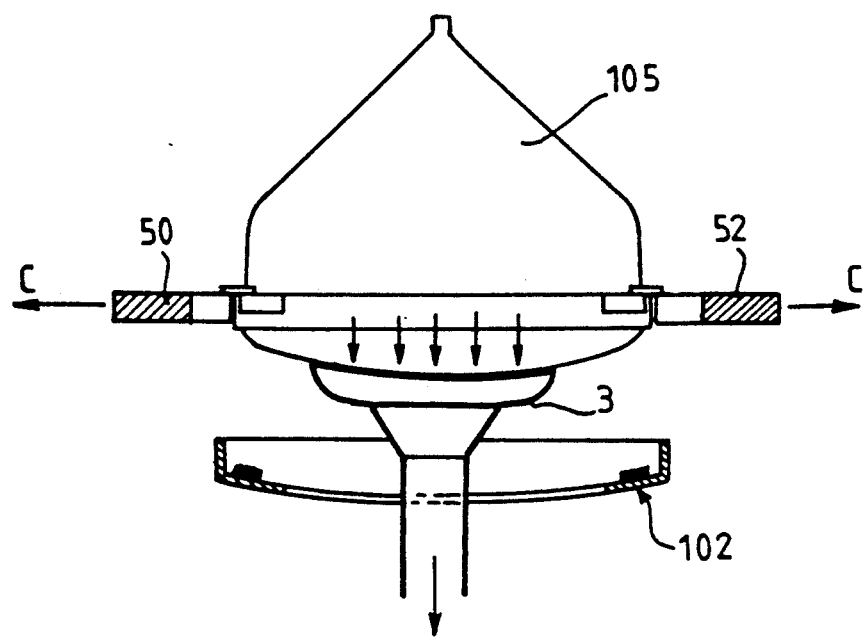
FIG. 2 shows a schematic view of the manner in which a suction is placed on the tube and opening of the V support blocks.
Figure 3:
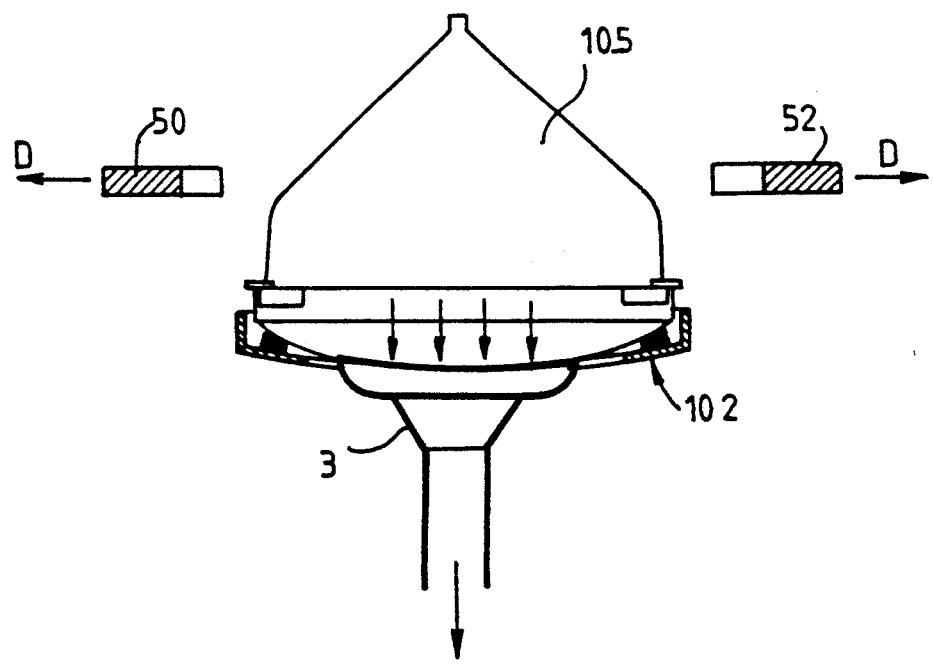
FIG. 3 is a schematic view showing placement of the tube, centered on the front face.

The described machine is used to assemble monitors of the type shown in FIG. 5, by a method that will now be described in conjunction with FIGS. 1-3.

When one wishes to assembly a monitor, the frame (102) is placed on its front face in the counterpart shape formed by the shoulder (2001) of the opening (200) in the table (20). The nozzle (3) is raised by the jack (4) above the surface of the table (20). A manipulating arm or an operator places the tube (105) of the monitor on this nozzle (3). In this phase, the interior of the nozzle (3) is supplied via the tube (30) with air in such a way as to blow air upward toward the face of the tube with sufficient force such that this air keeps the tube (105) in suspension above the nozzle (3). The advancement of the nozzle (3) is calculated in such a manner that the tube (105), suspended above the nozzle, is located with the fixation pins (1050) of the tube above the upper plane of the plates (50, 52) forming a centering V shape supporting block via the centering prongs (501, 521). Next, plates (50, 52) are actuated so as to clamp the tubes inside the V shaped cutout formed by prongs (501, 521) and center it. Because the tube is kept centered by the prongs forming the V shape cutout, the direction of operation of the air distributor can be reversed, to make it function in the suction mode At that moment, the nozzle (3) attracts the tube (105) to itself and keeps it in the position defined by the supporting blocks (50, 52). The latter can then be actuated in the direction of the arrow C of FIG. 2 in order to move away from the tube (105). The nozzle and tube assembly is then displaced downward by the jack (4) in such a way as to put the tube in contact with the front face (102) of the frame, as shown in FIG. 3, in which for the sake of clarity in the drawing, the counterpart shape (2001), on which the front face rests, has not been shown. The centering of the tube on the front face can be maintained either by adhesive portions (1024) disposed over the inside periphery of the front frame, or by a fixation mode such as screwing or welding or heat deformation of plastic prongs passing through openings in the tube fixation tabs (1050) and case fixation tabs (112). The steps of placement of the tube on the frame (102) are completed by a step of placement of the case (110), which can be done either manually or automatically by a manipulator arm. Similarly, in the course of the step of lowering the tube onto the frame (102), care will be taken to install cushioning disks (104), if necessary, between the boss (1021) of the frame and the attachment tabs (1050) of the tube. If necessary, care will also be taken to place cushioning disks (106) between the attachment tabs (1050) of the tube and the fixation tabs (112) of the case. Next, the assembly is completed by a step of fixation of the frame/tube/case set, which as shown in FIG. 5 may be constituted by turning screws (111) with the aid of electric screwdrivers (81) put into place automatically by the carriages (70, 72) actuated by the jacks (80, 82). In another variant embodiment, the bosses (1021) may be replaced with heat-deformable pegs that are passed through the opening in the tube fixation tabs (1050) and case fixation tabs (112) and are then deformed by being heated to assure the assembly.

Further modifications within the competence of one skilled in the art are also within the spirit and scope of the invention.

We claim:

1. A method of assembling a tube (105) of a monitor on a front frame (102) of the monitor, characterized in that it includes the following steps:
   a) placement of a front frame (102) in a housing (2001) provided for that purpose;
   b) blowing air through a nozzle to maintain the tube (105) in suspension;
   c) centering the tube (105) by way of two V shaped support blocks (501, 521) displaced concentrically and simultaneously, while the tube (105) is in suspension;
   d) reversing the air flow to place a suction on the tube (105) and opening of the V shaped support blocks (501, 521) with a delay period;
   e) lowering of the tube (105) while connected to the suction system (3) inside the front face (102) to place it into contact with zones (1024) having a high coefficient of adhesion;
   f) joining the tube solidly to the front face (102);
   g) stopping the air flow to terminate the suction and release the assembled set.

2. The method of assembly of claim 1, characterized in that between step a) and step b), it includes a step of placing first cushioning disks (104) on the tube.

3. The method of claim 1 or 2, characterized in that between step d) and step e), it includes a step of placing second cushioning disks (106) on the tube and placing a case (110) on the second cushioning disks (106).

4. A machine for assembling a monitor tube on a front frame (102), characterized in that it includes a table (20) having a housing (2001) adapted to receive a frame which forms the front face (102) of the monitor, said housing (2001) including an opening (200) in its center, means for alternatively applying suction and air pressure to a nozzle (3) that is movable along a vertical axis passing through the center of symmetry of the housing (2001) and adapted to be actuated by a first jack (4), a centering device (50, 52) actuated by a second jack (63) for centering the cathode ray tube, a set of two movable platforms (70, 72) controlled for crosswise displacement by third jacks (80, 82) to place the fixation tools (81) into position.

5. The machine of claim 4, characterized in that the centering device is constituted by a pair of sets (201, 202, 207, 208) (203, 204, 205, 206) of columns mounted vertically on the table (20) and supporting rollers on their end, each set forming a rolling track for centering plates (50, 52) disposed on either side of the opening (200), said centering plates (50, 52) including prongs (501, 521) that form V shape supporting blocks and an oblique groove (502, 522) inclined so as to control the approach toward one another of the centering plates upon the displacement of an actuation prong (601, 621) controlled by a jack (63).

6. The machine of claim 5, characterized in that the actuation prongs (601, 621) are connected to a U-shaped part constituted by two plates (60, 62) joined by a crosswise bar (61) actuated by a single jack (63), the legs of the U part sliding between the rollers in a direction perpendicular to the direction in which the centering plates (50, 52) slide.

7. The machine of claim 4 or 5, characterized in that the two platforms (60, 70) slide between the rollers and support tools (81) for screwing or welding or gluing the set together.

* * * * *